United States Patent [19]
Kimzey

[11] 3,911,360
[45] Oct. 7, 1975

[54] VARIABLE TIME DELAY VOLTAGE DROPOUT DETECTOR

[76] Inventor: Gene A. Kimzey, 2329 Tulip Road, San Jose, Calif. 95128

[22] Filed: Feb. 11, 1974

[21] Appl. No.: 441,576

[52] U.S. Cl............ 324/133; 340/248 A; 340/248 B
[51] Int. Cl.²......................................... G01R 19/16
[58] Field of Search.................... 324/133, 51, 111; 340/248 A, 248 B, 248 C, 253; 328/135

[56] References Cited
UNITED STATES PATENTS

| | | | |
|---|---|---|---|
| 2,564,829 | 8/1951 | Bedford et al. | 324/111 X |
| 3,122,729 | 2/1964 | Bothwell et al. | 340/248 A |
| 3,204,193 | 8/1965 | Rhyne | 340/248 B |
| 3,389,789 | 6/1968 | Watson et al. | 324/54 UX |
| 3,524,075 | 8/1970 | Matthews et al. | 328/135 X |
| 3,532,905 | 10/1970 | Fijta et al. | 328/135 X |
| 3,548,302 | 12/1970 | Arnold et al. | 324/54 |
| 3,564,528 | 2/1971 | Drushel | 340/253 R X |
| 3,663,958 | 5/1972 | Crane | 324/133 |
| 3,713,020 | 1/1973 | Kohler | 324/51 |
| 3,735,250 | 5/1973 | Masui | 324/51 |

Primary Examiner—Gerard R. Strecker
Attorney, Agent, or Firm—Jack M. Wiseman

[57] ABSTRACT

A voltage monitoring system includes a comparator circuit having one input connected to a first reference voltage source and a second input connected through a timing circuit to the voltage to be monitored. An output of the comparator is connected to a set input of a flip-flop having its output connected to a light emitting diode indicator. A second comparator has one input connected to a second reference voltage source and a second input connected through a reset switch to the voltage being monitored. An output of the second comparator is connected to the reset of the flip-flop.

2 Claims, 1 Drawing Figure

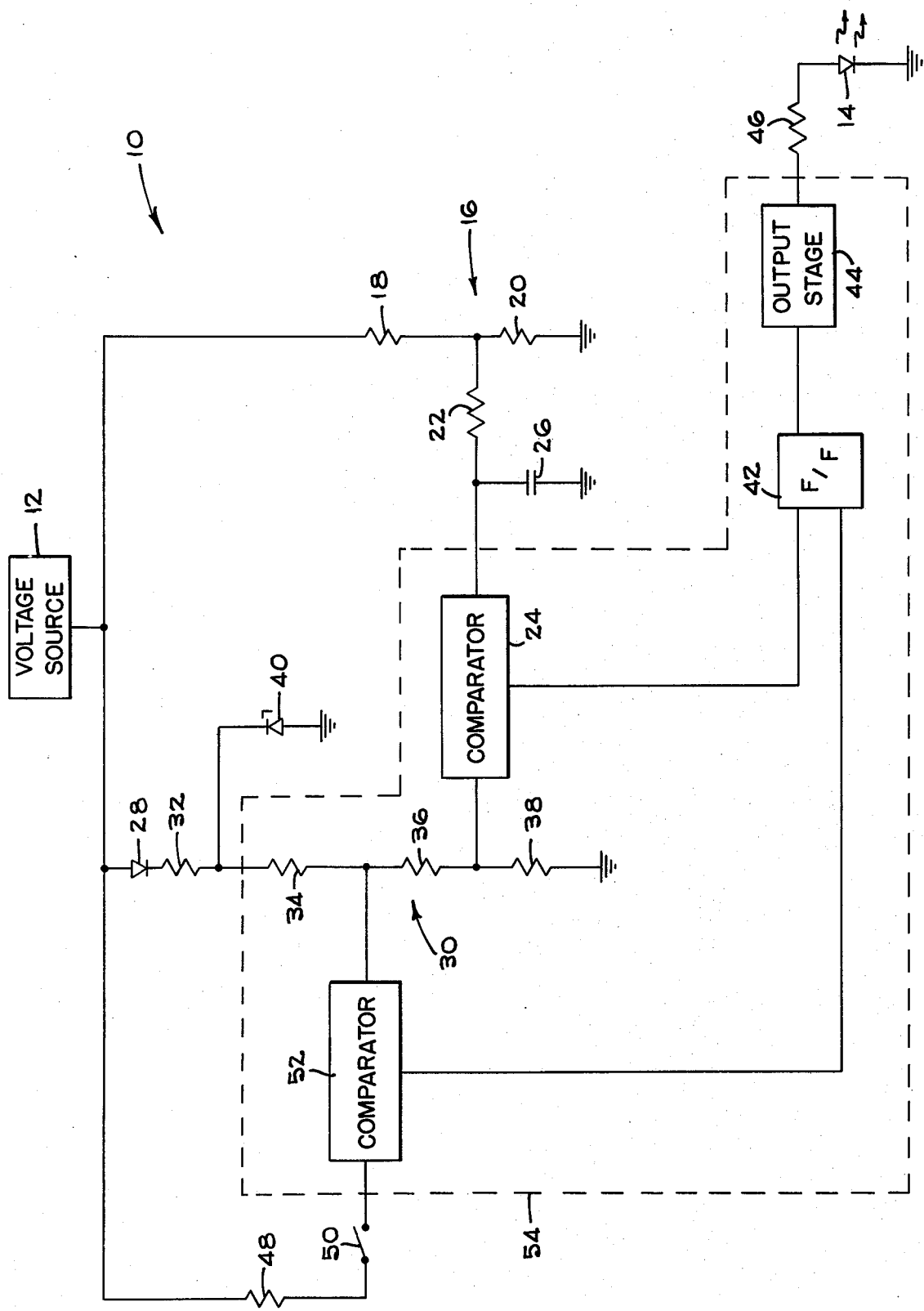

VARIABLE TIME DELAY VOLTAGE DROPOUT DETECTOR

BACKGROUND OF THE INVENTION

1. Field of the Invention

This invention relates generally to a voltage monitor and more particularly to a circuit for indicating a reduction in the voltage of a voltage source and maintaining such an indication after the voltage has returned to its normal level and until the circuit is reset.

2. Prior Art

A large variety of devices are available for monitoring voltages. Generally, these devices are relatively complicated, since they are designed to perform a variety of functions. There is, however, a need for a device the sole purpose of which is to monitor the voltage level of a voltage source and to provide an indication to an operator whenever the voltage of such a source drops below a predetermined level.

One of the devices which is available for recording voltage levels is a pen register clocked voltage recorder which provides a visual indication of the voltage of a voltage source versus time on a chart. Such a device generally requires a skilled operator to install and connect it to the voltage source of the circuit under observation and to read and interpret the results. Furthermore, such pen recorders are relatively large and, therefore, not readily portable, and are generally expensive to purchase and maintain.

Another available device for monitoring voltage is the commonly known volt meter. Electronic volt meters are generally not capable of maintaining a record of past events, and, therefore, require continuous attendance by an observer. Furthermore, such devices are intended to provide an indication of a voltage level which can vary over a considerable range. Accordingly, such devices are generally expensive to purchase and maintain.

Another well known device which is available for monitoring voltage is the commonly known oscilloscope. A considerable amount of skill is required to operate and understand the results displayed by an oscilloscope. In addition, oscilloscopes are generally relatively large and not easily portable. Furthermore, oscilloscopes are generally expensive to purchase and maintain.

Special purpose circuits have been developed for detecting the voltage level of a voltage source. The majority of these circuits, however, suffer from one or more disadvantages and are not suitable for certain applications. One of the problems associated with such circuits is the relatively low degree of accuracy which can be obtained without the use of complicated and relatively expensive circuitry. In addition, they are not easily convertible to sense different voltage levels. Furthermore, the majority of such circuits are generally sensitive to changes in temperature and adverse environmental conditions.

One such special purpose circuit employs one or more Zener diodes in series with an impedence element between an output of the voltage source and ground potential. If the output of the voltage source remains above a predetermined level, the junction between the Zener diode and the impedance element remains at a high voltage level. However, if the output of the voltage source reduces below the predetermined voltage level, the voltage level at the junction of the Zener diode and the impedance element will abruptly drop to ground potential. By sensing the voltage level at the junction of the Zener diode and the impedance element and actuating an indicating device in accordance with that level, an indication is provided whenever the output of the voltage level drops below the predetermined level. Generally, this type of circuit has a relatively low degree of accuracy and cannot be easily converted to sense different voltage levels of the voltage source of the circuit being monitored. In addition, this type of circuit is sensitive to temperature variations and to adverse environmental conditions.

SUMMARY OF THE INVENTION

It is, therefore, a primary object of the invention to provide an improved circuit for monitoring the voltage level of a voltage source.

Another object of the present invention is to provide a circuit for monitoring the voltage level of a voltage source and for indicating a reduction in the voltage and for maintaining such an indication after the output of the voltage source has returned to its normal level.

A further object of the present invention is to provide a voltage monitoring circuit which is relatively uncomplicated.

Still another object of the present invention is to provide a voltage monitoring circuit having a relatively high degree of accuracy.

A further object of the present invention is to provide a voltage monitoring circuit which can remain unattended and which requires a relatively unskilled operator to install and observe the results thereof.

Yet another object of the present invention is to provide a voltage monitoring circuit which is relatively inexpensive to purchase and maintain.

Still a further object of the present invention is to provide a voltage monitoring circuit which is relatively small in size and, therefore, readily portable.

Another object of the present invention is to provide a voltage monitoring circuit which is relatively stable with the changes in temperature and relatively insensitive to adverse environmental conditions.

These and other objects of the present invention are obtained by the provision of a comparator circuit having a first input connected through a voltage divider to the voltage source being monitored and having a second input connected to a reference voltage. An output of the comparator circuit is connected to an indicator device to provide an indication of the condition of the voltage source with respect to a predetermined voltage level. A feature of the present invention resides in the provision of a storage circuit connected between an output of the comparator circuit and the indicating device, such that once the voltage level of the voltage source drops below the predetermined level, an indication of that condition is maintained until the voltage has returned to its normal level and until the storage circuit is reset. Another feature of the present invention resides in the provision of second comparator circuit which is responsive to the reference voltage level and to the output of the voltage source being monitored for resetting the storage circuit.

These and other objects, features and advantages of the present invention, however, will be more fully realized and understood from the following detailed description taken in conjunction with the accompanying drawing wherein the single FIGURE is a partial block and partial schematic diagram of a voltage monitoring circuit constructed in accordance with the principals of the present invention.

DETAILED DESCRIPTION OF THE PREFERRED EMBODIMENT

With reference to the drawing, there is shown a voltage monitoring circuit, generally designated with reference numeral 10, which is constructed in accordance with the principles of the present invention. The voltage monitoring circuit 10 is connected to a voltage source 12, the output of which is to be monitored, and to an indicator provided by a light emitting diode 14 that is on whenever the output of the source 12 falls below a predetermined voltage level. The circuit 10 includes a voltage divider 16 which is formed of a pair of resistors 18 and 20. The resistors 18 and 20 are connected in series between an output of the voltage source 12 and ground potential. A junction between the resistors 18 and 20 is connected through a resistor 22 to a first input of a comparator circuit 24. This input of the comparator circuit 24 is connected through a capacitor 26 to ground potential.

An output of the voltage source 12 is also connected through a diode 28 and a voltage divider circuit 30 to ground potential. The voltage divider circuit 30 includes resistors 32, 34, 36 and 38 connected in series. The junction between the resistors 32 and 34 is connected through a Zener diode 40 to ground potential. The junction between the resistors 36 and 38 is connected to a second input of the comparator circuit 24. The foregoing provides a reference voltage which is applied to the record input of the comparator circuit 24. It can be appreciated that the Zener diode 40 maintains the reference voltage level at all points of the voltage divider circuit 30 constant until the output of the voltage source 12 falls below the predetermined level.

An output of the comparator circuit 24 is connected to the "set" input of a flip-flop circuit 42 having its output connected to the input of an output stage 44. A resistor 46 is connected in series between the light emitting diode 14 and the output of the output stage 44.

Initially, when the output voltage of the voltage source 12 is above a predetermined level, the first input to the comparator circuit 24 from the voltage divider circuit 16 will be at a higher level than the level of the second input thereof supplied from the voltage divider circuit 30. Under such a condition, the output of the comparator circuit 24 will be low and no indication will be provided by the light emitting diode 14 being off. However, when the output of the voltage source 12 falls below that of the predetermined level, the voltage supplied at the first input of the comparator circuit 24 from the voltage divider 16 will fall, after a predetermined time delay, below the reference level of the voltage supplied at its second input. Under such a condition, the output of the comparator circuit 24 will be high and will set the flip-flop 42, thereby energizing the light emitting diode 14 to provide an indication of such a condition. The resistors 20 and 22 and the capacitor 26 provide a relatively short time delay, such that a relatively short duration transience in the output of the voltage source 12 will not provide such a high output from the comparator circuit 24.

An output of the voltage source 12 is connected through a resistor 48 and a switch 50 in series with one another to a first input of a comparator circuit 52 which in the exemplary embodiment in the form of a current limiting resistor. The junction between the resistors 34 and 36 of the voltage divider circuit 30 is connected to a second input of the comparator circuit 52. An output of the comparator circuit 52 is connected to the "reset" input of the flip-flop circuit 42. With the switch 50 in an open condition, the output of the comparator circuit 52 will be low, thereby not effecting the condition of the flip-flop circuit 42. Thus, the light emitting diode 14 remains on. However, when the switch 50 is closed, the output of the comparator circuit 52 will reset the flip-flop circuit 42 and raise the voltage across the voltage divider 30 to its initial reference potential. The light emitting diode 14 is returned to its initial state and the reference input to the comparator circuit 24 is reset to its initial state. It is apparent that the reset state can only be effected when the source of voltage 12 has returned the output thereof to a magnitude equal to or greater than the predetermined voltage level.

The circuit elements which are illustrated as being contained within a dotted line designated with the reference numeral 54 are available as one linear circuit contained in one package from Signetics Corporation of Sunnyvale, Calif., and designated as part number SE555V or NE555V.

In one constructed embodiment of the present invention and with an output of the voltage source 12 in the range of 20 to 26 volts, the following values for the components, not including the circuit 54, are employed:

| | |
|---|---|
| Resistor 18 | 3740 ohms |
| Resistor 20 | 953 ohms |
| Resistor 22 | 180k ohms |
| Resistor 32 | 560 ohms |
| Resistor 46 | 560 ohms |
| Resistor 48 | 180k ohms |
| Capacitor 26 | 2 microfarads |
| Zenor diode (breakdown voltage) | 12 volts |

The time delay circuit including the resistor 22 and the capacitor 26 provided a time delay in such a constructed embodiment of twenty-five milliseconds.

It can be readily appreciated that by changing the values of the resistors 18, 22 and 32, the diode 28 and the Zener diode 40, that different voltage levels at an output of the voltage source 12 can be sensed. The diode 28 provides protection for the circuit in the event that it is connected to the voltage source being monitored with an opposite polarity. The resistor 32 is employed for limiting the current flow through the Zener diode 40 and into the corresponding input of the comparator circuits 24 and 52. It can be appreciated that an output of the voltage source 12 can be either direct current voltage or rectified alternating current voltage. In the above-described constructed embodiment, when the output of the voltage source 12 drops below a level of 20 volts, the light emitting diode 14 will be energized to provide an indication of such a condition. Once such a condition occurs, the light emitting diode 14 will remain energized regardless of the voltage level of the voltage source 12 until the flip-flop circuit 42 is reset by closure of the switch 50.

I claim:
1. A circuit for monitoring the voltage level of a voltage source, comprising:
  a. a first comparator circuit, b. a first voltage divider circuit connected between the voltage source and a first input of said first comparator circuit, c. circuit means forming a source of reference voltage for supplying a reference voltage to a second input of said first comparator circuit, d. an indicator connected to an output of said first comparator circuit, e. a time-delay circuit connected between said voltage divider circuit and the first input of said first comparator circuit, f. means for storing the output of said first comparator circuit and connected between said first comparator circuit and said indicator, said storing means including a flipflop circuit having a first input connected to the output of said first comparator circuit and an output connected to said indicator, g. a second comparator circuit, and h. a switch connected between the voltage source and a first input of said second comparator circuit, said circuit means being connected to a second input of said second comparator circuit for supplying the reference voltage thereto and an output of said second comparator circuit being connected to a second input of said flip-flop.

2. A circuit as defined in claim 1, wherein said circuit means includes a second voltage divider circuit connected between the voltage source and ground potential, a first tap of said second voltage divider circuit being connected to the second input of said first comparator circuit, a second tap of said second voltage divider circuit being connected to the second input of said second comparator circuit, and a Zener diode connected between a third tap of said second voltage divider circuit and ground potential.

* * * * *